(12) United States Patent
Wang et al.

(10) Patent No.: US 11,797,412 B2
(45) Date of Patent: *Oct. 24, 2023

(54) BLOCK-BASED ANOMALY DETECTION IN COMPUTING ENVIRONMENTS

(71) Applicant: Oracle International Corporation, Redwood City, CA (US)

(72) Inventors: Fa Wang, Palo Alto, CA (US); Raymond Michael Ofiaza Ordona, Hayward, CA (US); Mei Yuan, Foster City, CA (US); Xintao He, Beijing (CN); Campbell Webb, Wellesley, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,401

(22) Filed: Mar. 16, 2022

(65) Prior Publication Data

US 2022/0206922 A1 Jun. 30, 2022

Related U.S. Application Data

(63) Continuation of application No. 16/591,856, filed on Oct. 3, 2019, now Pat. No. 11,307,953.

(51) Int. Cl.
*G06F 11/00* (2006.01)
*G06F 11/30* (2006.01)
*G06F 11/07* (2006.01)

(52) U.S. Cl.
CPC ...... *G06F 11/3075* (2013.01); *G06F 11/0709* (2013.01); *G06F 11/0751* (2013.01); *G06F 11/0793* (2013.01)

(58) Field of Classification Search
CPC ............ G06F 11/3075; G06F 11/0709; G06F 11/0751; G06F 11/0793; G06F 11/3079; G06F 11/07; G06F 11/079
See application file for complete search history.

(56) References Cited

U.S. PATENT DOCUMENTS

| | | | |
|---|---|---|---|
| 9,430,405 B2 | 8/2016 | McMullen et al. |
| 9,514,213 B2 | 12/2016 | Wood et al. |
| 9,742,748 B2 | 8/2017 | McMullen et al. |
| 10,073,906 B2 | 9/2018 | Lu et al. |
| 10,270,788 B2 | 4/2019 | Faigon et al. |

(Continued)

OTHER PUBLICATIONS www.logentries.com/product/alerting-and-reporting, 4 pages, printed Oct. 6, 2020.

(Continued)

*Primary Examiner* — Katherine Lin

(57) ABSTRACT

An anomaly service receives log data from nodes in a computing environment, which includes a sequence of information indicative of log messages produced by the nodes. The anomaly service identifies dominant patterns in the sequence of information that are representative of non-anomalous blocks of the log messages. Having identified the dominant patterns, the service is able to extract the non-anomalous blocks from the log data to reveal anomalous blocks that do not fit the dominant patterns. The service may then generate anomaly vectors based on the anomalous blocks, which can be distributed to the nodes to detect anomalies.

20 Claims, 12 Drawing Sheets

(56) References Cited

U.S. PATENT DOCUMENTS

| | | |
|---|---|---|
| 10,721,256 B2 | 7/2020 | Urmanov et al. |
| 2014/0181975 A1 | 6/2014 | Spernow et al. |
| 2016/0292592 A1 | 10/2016 | Patthak et al. |
| 2018/0046529 A1* | 2/2018 | Togawa ............... G06F 11/0787 |
| 2018/0109531 A1 | 4/2018 | Urmanov et al. |
| 2018/0113676 A1 | 4/2018 | De Sousa Webber |
| 2019/0102437 A1 | 4/2019 | Patthak et al. |
| 2019/0102553 A1 | 4/2019 | Herwadkar et al. |
| 2019/0303421 A1 | 10/2019 | Bonnell |
| 2019/0325029 A1 | 10/2019 | Gandhi et al. |
| 2019/0354524 A1 | 11/2019 | Xu et al. |
| 2020/0073741 A1 | 3/2020 | Wang et al. |
| 2020/0112475 A1 | 4/2020 | Garapati et al. |
| 2020/0285737 A1* | 9/2020 | Kraus ................... G06F 21/552 |

OTHER PUBLICATIONS https://logz.io/learn/complete-guide-elk-stack, 99 pages, printed Oct. 6, 2020.

https://www.elastic.co/products/stack/machine-learning, 5 pages, printed Oct. 6, 2020.

https://www.elastic .co/solutions/logging, 3 pages, printed Oct. 5, 2020.

A Barron et al., The Minimum Description Length Principle in Coding and Modeling, IEEE Trans. on Information Theory, vol. 44, No. 6, Oct. 1998.

* cited by examiner

| sub. | r-block | log sequence | MDL(r) | p-block | MDL(p) |
|---|---|---|---|---|---|
| hash_1=A<br>hash_2=B<br>hash_3=C<br>hash_4=D<br>...<br>hash_n-1=Y<br>hash_n=Z | A | ABCYZABCABCABDABDABD | 23 | A | 19 |
| | α = AB | αCYZαCαCαCαDαDαD | 19 | λ=αC | 17 |
| | α | λYZ[λ]3ABDABDABD | 17 | δ=ABD | 15 |
| | Y | λμ [λ]3 δ[4] | 14 | μ = YZ | 16 | process table 801

FIGURE 8

BLOCK-BASED ANOMALY DETECTION IN COMPUTING ENVIRONMENTS

RELATED APPLICATIONS

This application claims the benefit of and priority to U.S. patent application Ser. No. 16/591,856 entitled "BLOCK-BASED ANOMALY DETECTION IN COMPUTING ENVIRONMENTS," filed on Oct. 3, 2019, which is hereby incorporated by reference in its entirety for all purposes.

TECHNICAL BACKGROUND

Modern information services handle vast amounts of data and, in the process, generate large volumes of log data. Log data is produced by code at runtime to provide a record of the state of one or more components of a service. The log data may be useful when trouble shooting or otherwise maintaining the service. Examples of log data include log statements and operational metrics, both of which can be analyzed to predict anomalous conditions or events such as process failures, server failures, and computer hardware failures.

Anomalies can be detected and predicted by analyzing huge swaths of log data for patterns in the statements or metrics that correlate to past anomalies. The patterns may then be deployed against data such that the presence of a given pattern in the data triggers a mitigating action or alert. Unfortunately, such pattern extraction requires an onerous amount of log data that is prohibitively expensive to both transport and process.

In fact, the amount of log data that would need to be sent from the edge to a centralized server, in order to successfully extract useful patterns, could easily approach the amount of normal operational data that is sent in the same direction—assuming the bandwidth exists to do so. In addition, the amount of compute required to find the patterns in a reasonable timeframe could exceed that allocated to normal operations in the first place. Such limitations have heretofore hindered the development and deployment of effective anomaly analysis.

SUMMARY

Technology is disclosed herein that improves the detection and prediction of anomalous conditions in computing environments. In various implementations, an anomaly service receives log data from edge nodes in a computing environment, which includes a sequence of information indicative of log messages produced by the nodes. The anomaly service identifies dominant patterns in the sequence of information that are representative of non-anomalous blocks of the log messages. Having identified the dominant patterns, the service is able to extract the non-anomalous blocks from the log data to reveal anomalous blocks that do not fit the dominant patterns. The service may then generate anomaly vectors based on the anomalous blocks, which can be distributed to the edge nodes to detect anomalies.

In the same or other implementations, one or more of the nodes in a computing environment receive the anomaly vectors. Log messages are produced as events occur in the computing environment, in response to which the node generates a corresponding sequence of hash values. A sequence vector is produced based on the sequence of hash values, which can be compared to or otherwise evaluated against the anomaly vectors to determine if the log messages indicate an occurrence of one or more anomaly events.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 8 further illustrates an anomaly block extraction scenario.

TECHNICAL DISCLOSURE

Figure 1:
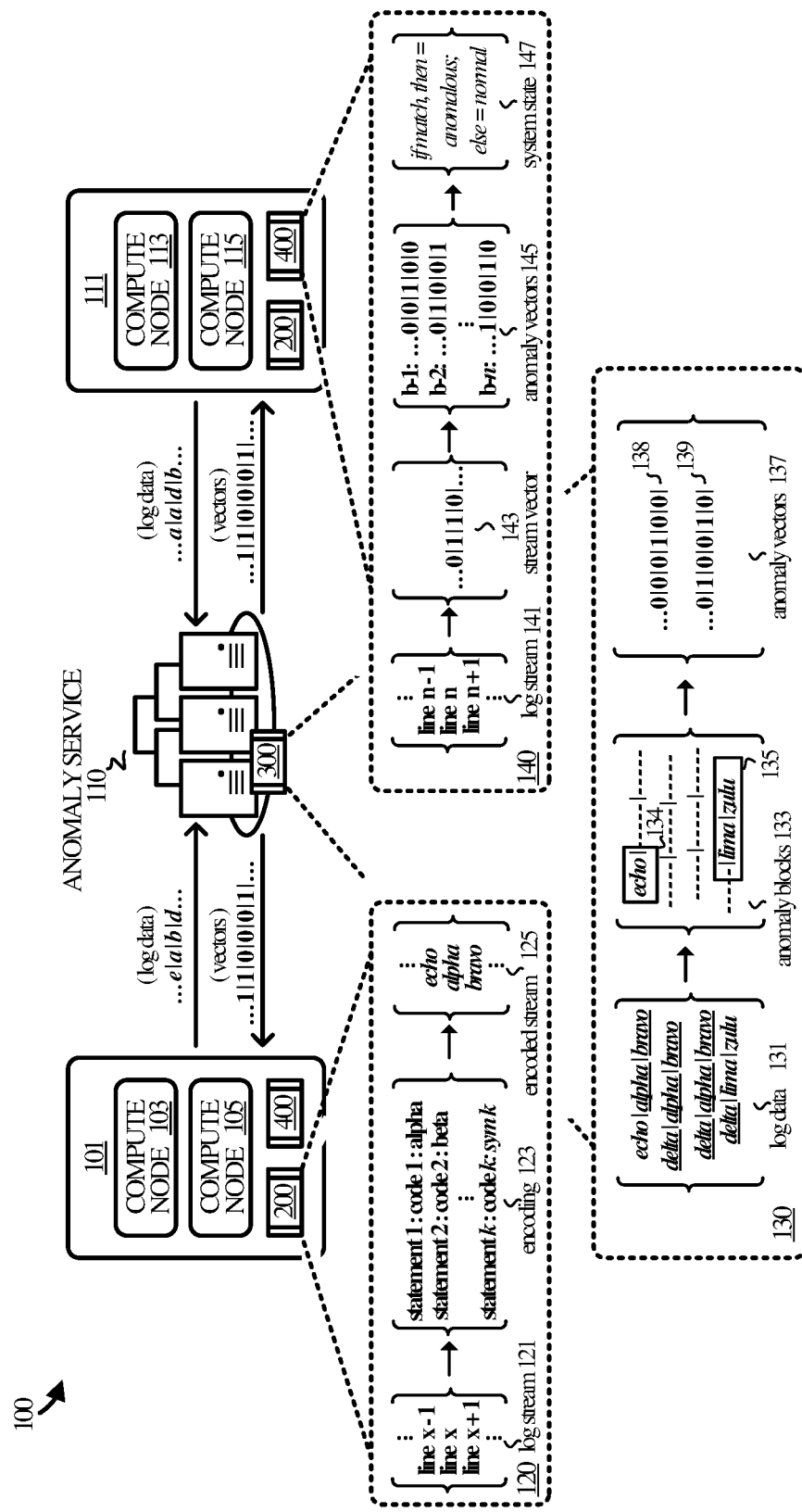
FIG. 1 illustrates an operational architecture in an implementation.

Solutions disclosed herein relate to the block-based detection and prediction of low probability behavior, e.g. anomalous behavior, in computing environments. An anomaly service receives log data from edge nodes in one or more computing environment that may be remote from and/or co-located with respect to the service. The log data comprises a sequence of information indicative of log messages produced by the nodes at runtime.

The anomaly service identifies dominant patterns in the sequence of information that are representative of non-anomalous blocks of the log messages. The service extracts or otherwise ignores the non-anomalous blocks from the log data to reveal anomalous (or low probability) blocks that do not fit the dominant patterns. The service then generates anomaly vectors based on the anomalous blocks and distributes them to the nodes.

One or more nodes in the computing environment(s) receive the anomaly vectors and employ them to discover anomalous behavior in a stream of log messages. A given node generates a sequence of hash values based on a sequence of log messages associated with events in the computing environment. The node also generates a sequence vector based on the hash values. The sequence vector comprises, for example, a string of numbers corresponding by position to a set of possible hash values.

The node then performs a comparison of the sequence vector to a set of anomaly vectors to determine if at least a portion of the hash values indicates an occurrence of one or more anomaly events. If so, then one or more actions can be taken to mitigate the risk of a problematic or anomalous event predicted by the comparison.

Referring back to the anomaly service, the service may identify the dominant patterns by finding potential patterns within the sequence of information and scoring them. The dominant patterns may then be selected based on the scoring. In some scenarios, the scoring function may serve to promote a subset of the potential patterns that occur frequently within the sequence of information relative to a different subset of the potential patterns that occur less frequently within the sequence of information. The scoring function determines, for each potential pattern of the potential patterns, a relative dominance of the potential pattern based on a description length of the sequence of information when encoded with a compressed representation of the potential pattern.

In some implementations the sequence of information comprises a sequence of log codes and each log code may be a symbolic representation of a possible hash value. In such cases, the log data would also include a code book or dictionary that maps each unique log code to a different one of a set of possible hash values.

In various implementations each of the anomaly vectors comprises a string of numbers that correspond by position to a set of possible log codes. The anomaly service sets a value of each number in the string to indicate a presence, or lack thereof, of a corresponding one of the possible log codes in an anomaly block represented by the anomaly vector.

Referring again to the client nodes, a given node generates the sequence vector by calculating a weighted value for each number of the string of numbers. The node calculates the weighted value by multiplying a weighting factor times a binary value to obtain the weighted value. The binary value indicates whether the sequence of hash values includes a hash value corresponding to the position of a given number in the string, while the weighting factor indicates a relative importance of the log message to other log messages.

In some implementations, the nodes perform the comparison of the sequence vector to the set of anomaly vectors by applying a cosine similarity function to an inner dot product of the sequence vector and each of the set of anomaly vectors. The results can be compared to determine whether the sequence vector sufficiently matches one or more of the anomaly vectors to indicate an anomalous state of the computing environment.

It may be appreciated that the anomaly detection technology disclosed herein allows events that deviate from what is standard, normal, or to be expected, to be detected more efficiently and with less operational overhead. For instance, the log codes sent by client nodes to an anomaly service require less bandwidth than the full log statements themselves, while distributing anomaly vectors to the edge allow anomalies to be detected at their source.

It may be further appreciated that low-probability events may also be predicted and/or detected—not just anomaly events. In such implementations, a service receives log data from nodes in a computing environment, wherein the log data comprises a sequence of information indicative of log messages produced by the nodes. The service identifies, in a sequence of information, dominant patterns representative of high-probability blocks of the log messages, and extracts the high-probability blocks from the log data based on the dominant patterns, revealing low-probability blocks that do not fit the dominant patterns;

The service then generates low-probability vectors based at least on the low-probability blocks and distributes data to the nodes to detect low-probability events. The nodes may then deploy the low-probability vectors (included in the data) against new streams of log messages and other such data.

Figure 10:
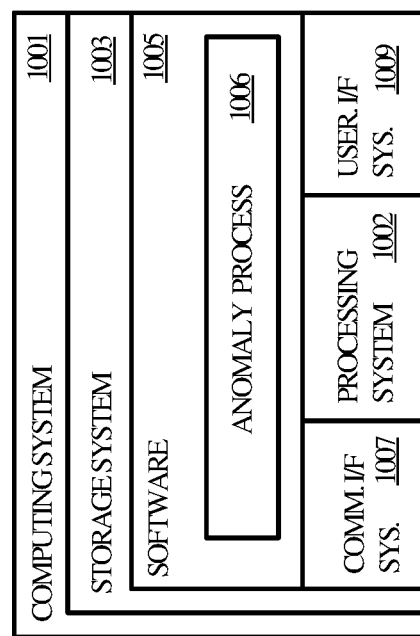
FIG. 10 illustrates a computing system suitable for implementing the enhanced anomaly detection technology disclosed herein, including any of the architectures, processes, operational scenarios, and operational sequences illustrated in the Figures and discussed below in the Technical Disclosure.

Turning to the drawings, FIG. 1 illustrates operational environment 100 in an implementation. Operational architecture 100 includes anomaly service 110 in communication with computing environment 101 and computing environment 111. Computing environment 101 includes one or more edge compute nodes of which compute node 103 and compute node 105 are representative. Computing environment 111 also includes one or more compute nodes, of which compute node 113 and compute node 115 are representative. Anomaly service 110 receives log data from, and sends anomaly vectors to, computing environments 101 and 111. Anomaly service 110 and computing environments 101 and 111 may be implemented with one or more server computers, of which computing system 1001 in FIG. 10 is representative.

In operation, computing environments 101 and 111 employ log production process 200 to generate log data for anomaly service 110. Anomaly service 110 employs extraction process 300 with respect to the log data to extract anomaly blocks and to generate the anomaly vectors later supplied to computing environments 101 and 111. Computing environments 101 and 111 then employ detection process 400 to detect, predict, or otherwise identify anomalous conditions in their respective environments.

Figure 2:
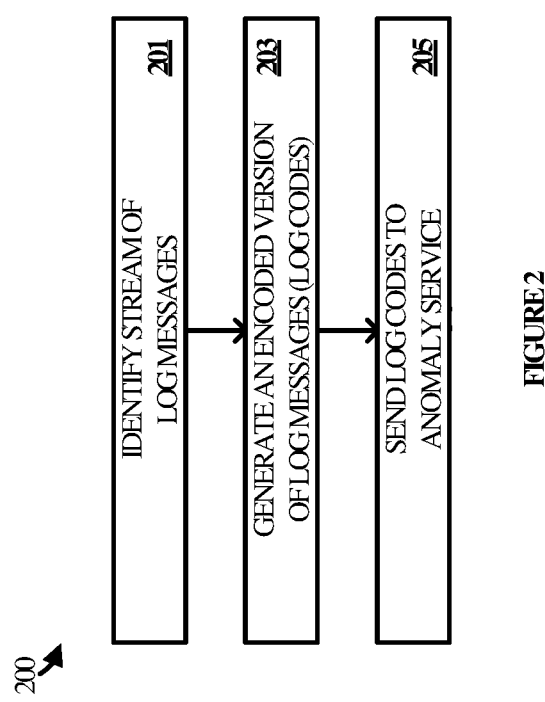
FIG. 2 illustrates a log production process in an implementation.

Log production process 200 may be implemented in program instructions in the context of any of the software applications, modules, components, or other such program elements of computing environments 101 and 111. For instance, log production process 200 may be implemented in the context of compute nodes 103 and 105 in computing environment 101, and in the context of compute nodes 113 and 115 in computing environment 111. Log production process 200 may also be implemented on any other computing elements of computing environments 101 and 111 in addition to, or instead of, their respective compute nodes. The program instructions direct the underlying physical or virtual computing system(s) to operate as follows, referring parenthetically to the steps illustrated in FIG. 2.

To begin, log production process 200 directs the computing system(s) to identify a stream of log messages or statements pertaining to the state of operations, applications, services, processes, or any other aspects of a given computing environment (step 201). Examples include log statements describing the start of a process, the end of a process, the failure of a process, the state of a database, the state of an application, or any other event that may be logged. The log messages may be identified by the same or a different component that generates the messages.

Next, log production process 200 directs the computing system(s) to generate an encoded version of the messages, hereinafter referred to as log codes (step 203). The log codes may be, for example, hash values produced by a hash function that takes the log statements as input and produces the hash values as output. The computing system(s) may modify the log messages prior to hashing them by, for instance, substituting generic place holders for uniquely identifying parts of the messages such as server names or process identifiers. Such a technique would allow the hash function to produce the same hash value for log messages that would be the same but for their unique identifiers.

In some scenarios, the log codes may be further encoded and/or compressed by substituting a different symbol for each of the various hash values produced by the hash function. For instance, the hash function may output a string of numbers corresponding to a given log statement. A shorter alphanumeric symbol could be substituted for the string of numbers, thereby reducing the size of the log code.

Lastly, log production process 200 directs the computing system(s) to send log data to an anomaly service, e.g. anomaly service 110, that includes the log codes (step 205). A dictionary may be included with the log data that maps the various log codes to their respective log statements in their generic form. In scenarios in which the log codes are compressed representations of the hash values, the dictionary may map the compressed representations to the log statements and/or to their corresponding hash values.

Figure 3:
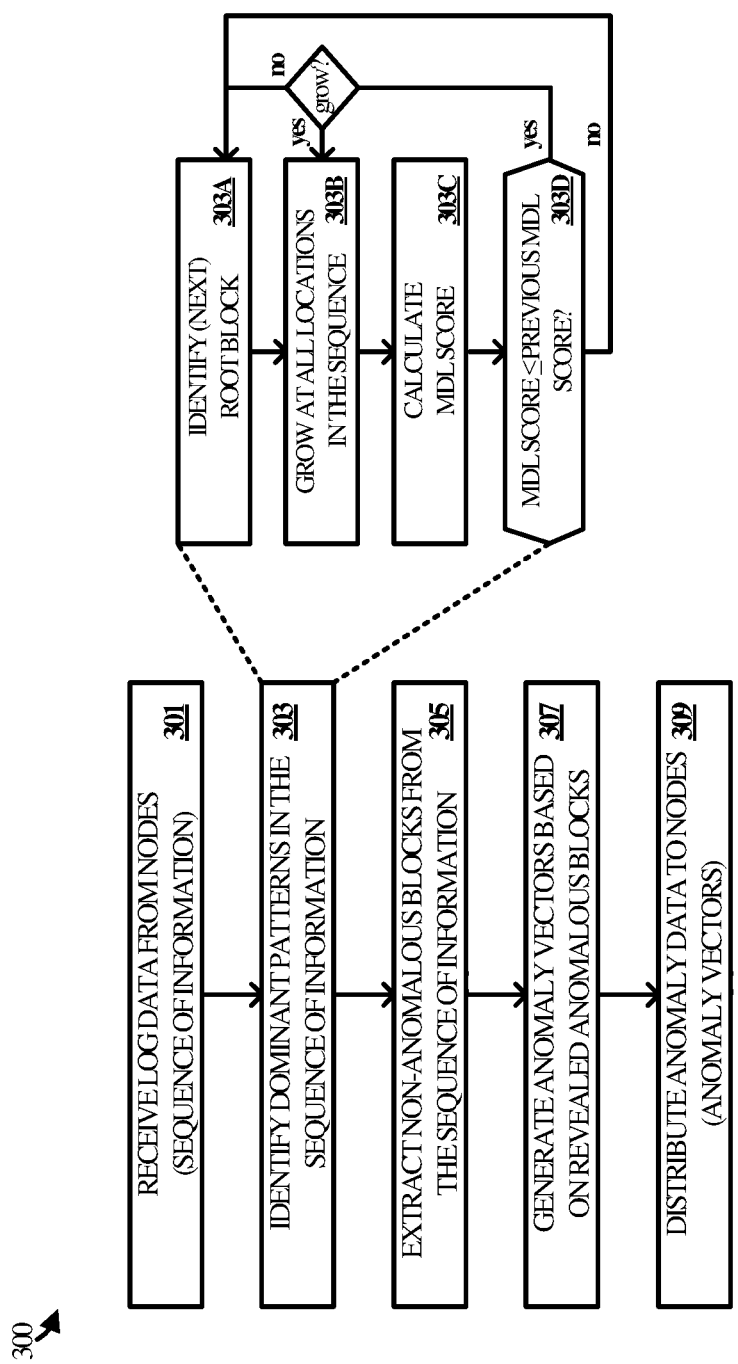
FIG. 3 illustrates an anomaly block extraction process in an implementation.

Extraction process 300, illustrated in FIG. 3, may be implemented in program instructions in the context of any of the software applications, modules, components, or other such program elements that comprise anomaly service 110. The program instructions direct the underlying physical or virtual computing system or systems of anomaly service 110 to operate as follows, referring parenthetically to the steps illustrated in FIG. 3.

Extraction process 300 begins with directing the computing system(s) to receive log data from compute nodes (step 301). The log data includes a sequence of information such as log codes generated and timestamped by the compute nodes.

Next, extraction process 300 directs the computing system(s) to identify dominant patterns in the sequence of information (step 303). Examples of the dominant patterns include patterns of log codes contiguous with respect to each other that occur repeatedly or with some frequency within the sequence of information that exceeds that of other, less dominant patterns. For instance, a snapshot of the log data may include one-thousand log codes, within which a block of three contiguous log codes repeats hundreds of times. Such a pattern may be considered a dominant pattern and may thus be considered non-anomalous. That is, the dominant pattern is likely representative of a pattern of log messages that is indicative of a normal state of operations, as opposed to an anomalous state that warrants an alert or other mitigation.

Steps 303A-303D in FIG. 3 represent a sub-process for identifying dominant patterns in the sequence of information, although other techniques are possible and are within the scope of the present disclosure. At step 303A, extraction process 300 directs the computing system(s) to identify a root block within the sequence of information. The root block may be, for example, the log code that appears in the sequence of information the most (or most frequently) relative to any others.

Next, extraction process 300 directs the computing system(s) to grow the root block by at least one code or symbol at every location in the sequence where it occurs (step 303B) and to calculate a meta data length (MDL) score for the new root block (step 303C). The MDL score is calculated by substituting the new root block at every location in the sequence with a symbol and then counting how much meta data is needed to describe the sequence of information as-modified. In scenarios where the sequence of information already comprises symbols instead of the hash values themselves, the symbol substituted for the new root block would replace a block of contiguous symbols that make up the new root block.

Extraction process 300 then proceeds to compare the new value of the MDL score to a previous value of the MDL score prior to expanding the root block (step 303D). If the MDL score is less than the previous MDL score, then the sub-process proceeds to step 303B to grow the root block at every possible location in the sequence. If the root block can no longer be expanded, then the process returns to step 303A to identify the next root block.

The process also returns to step 303A to identify the next root block if the MDL score is not less than the previous MDL score. If no more root blocks exist to be identified and grown, then the sub-process returns the resulting non-anomalous blocks to the main process. Alternatively, the sub-process may return to the main process upon finding a threshold number of non-anomalous blocks, even if one or more root blocks may exist.

Having identified the non-anomalous blocks, extraction process 300 directs the computing system(s) to extract the non-anomalous blocks from the sequence of information, thereby revealing remaining blocks that may be considered anomalous (step 305). Extraction process 300 then directs the computing system(s) to generate anomaly vectors based on the anomalous blocks (step 307) and distribute the vectors to computing environments, to facilitate their detection of anomalous conditions.

In some implementations, the revealed blocks may be submitted to a labeling and review process to confirm that a given block represents an anomaly. The labeling and review process may be performed manually by human operators, autonomously, or by a combination of manual and autonomous review. In other implementations, no review is needed. In situations where a review process is employed, the extraction process 300 serves to vastly reduce the amount of log statements to be reviewed manually, autonomously, or both. The results of the review process could optionally be provided as feedback to extraction process 300 to further enhance its ability to identify anomaly blocks. Blocks that were revealed as not non-anomalous, yet rejected during the review phase as not anomalous, could be re-classified as non-anomalous and identified to extraction process 300 for future use.

Figure 4:
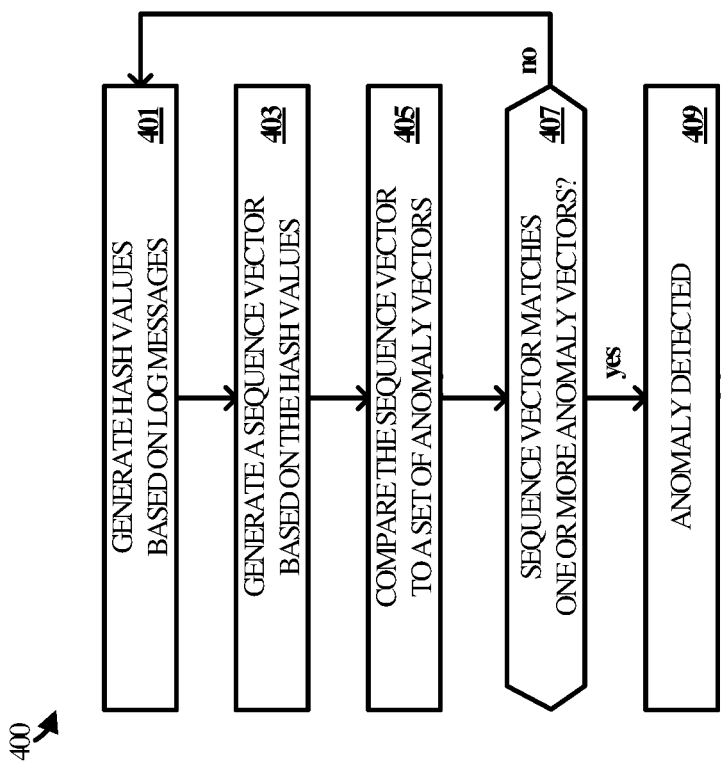
FIG. 4 illustrates an anomaly detection process in an implementation.

Anomalous conditions may be identified by employing detection process 400. Detection process 400 may be implemented in program instructions in the context of any of the software applications, modules, components, or other such program elements of computing environments 101 and 111. For instance, detection process 400 may be implemented in the context of compute nodes 103 and 105 in computing environment 101, and in the context of compute nodes 113 and 115 in computing environment 111. Detection process 400 may also be implemented on any other computing elements of computing environments 101 and 111 in addition to, or instead of, their respective compute nodes. The program instructions direct the underlying physical or virtual computing system(s) to operate as follows, referring parenthetically to the steps illustrated in FIG. 4.

Detection process 400 first directs the computing system(s) to generate hash values based on the log messages produced at run-time (step 401). The process then directs the computing system(s) to generate a sequence vector based on the hash values (step 403). The sequence vector is a vectorized version of the sequence of hash values produced from the log messages. In other words, the hash values are placed into a vectorized form. In some scenarios, the sequence vector may be produced directly from the log messages rather than the hash values or from a compressed representation of the hash values.

Having generated the sequence vector, detection process 400 directs the computing system(s) to compare the sequence vector to each of the anomaly vectors in the set of anomaly vectors provided by the anomaly service (step 405). At step 407, detection process 400 directs the computing system(s) to determine whether the sequence vector matches one or more of the anomaly vectors. If so, an anomaly has been detected (step 409). If not, then processing continues on the next sequence of information.

An exact match between the sequence vector and an anomaly vector need not be made for an anomaly to be identified. Rather, an approximate match may suffice to be considered an anomaly. A similarity function may be employed in some scenarios to determine which one of the anomaly vectors is a sufficient match with the sequence vector. For instance, a cosine similarity function may be applied to determine whether an anomaly vector is a sufficient match to the sequence vector. In addition, it may be appreciated the detection process 400 proceeds continuously as new log messages are generated.

Figure 5:
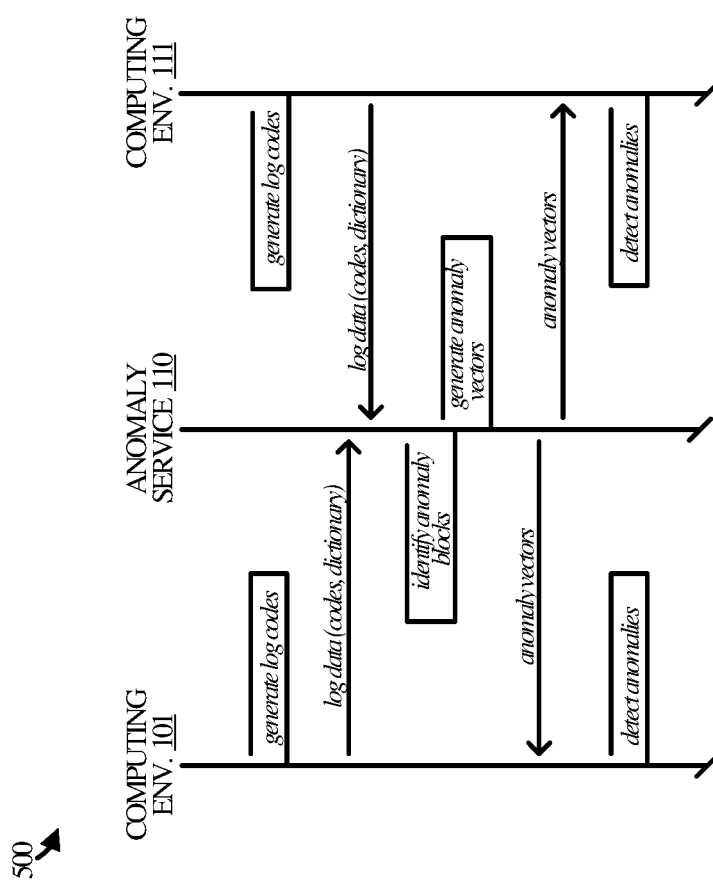
FIG. 5 illustrates an operational scenario in an implementation.

FIG. 5 includes a brief operational scenario 500 to illustrate the sequence of operations in an example. In operation, computing environment 101 generates log codes and sends the log codes in log data to anomaly service 110. Anomaly service 110 also receives log data from computing environment 111. Anomaly service 110 processes the log codes in the log data to identify anomaly blocks, with which it generates anomaly vectors.

The anomaly vectors are sent by anomaly service 110 to computing environment 101 and computing environment 111. The respective computing environments may employ the anomaly vectors against a stream of log messages to detect anomalies in the stream. In this manner, various anomalous events such as server failures, process failures, or the like, may be detected and/or predicted.

Referring back to FIG. 1, operational scenarios 120, 130, and 140 illustrate example implementations of log production process 200, extraction process 300, and detection process 400. It may be appreciated that operational scenario 120, while illustrated with respect to computing environment 101, could occur in the context of computing environment 111 as well. Likewise, operational scenario 140 is depicted with respect to computing environment 111 but could occur in the context of computing environment 101 as well.

In operational scenario 120, one or more compute nodes in computing environment 101 generate a stream of log messages 121. The logs in the stream are identified by their line number, such as line x−1, line x, and line x+1. A log production process running in computing environment 101 performs an encoding process 123 on the log statements to generate log codes. The process may, for example, anonymize each log statement by substituting place holder information for server or process specific information. The anonymized log statements may then be hashed to produce a hash value and the hash value further encoded as a symbol, word, or other such compressed representation of the hash value.

As an example, a total number of k different log statements may be possible once they have been anonymized. A deterministic encoding algorithm such as a hash would therefore produce the same output code for every input statement that is the same. Thus, statement_1 would be encoded as code_1, statement_2 would be encoded as code_2, and so on through statement_k. The codes are then further encoded as symbols or words. For example, code_1 maps to alpha, code_2 maps to bravo, and so on through code_k, although any symbols are possible.

The encoded stream 125 is then sent from computing environment 101 to anomaly service 110. The encoded stream 125 in this example includes at least a block of contiguous symbols—echo, alpha, and bravo—that trace back to code_4, code_2, and code_1 respectively, which themselves trace back to anonymized statement_4, statement_1, and statement_2 respectively. The encoded stream may be sent with other log data such as a dictionary that provides a mapping of the symbols to the codes and possibly to the anonymized statements.

In operational scenario 130, anomaly service 110 receives the log data generated by computing environment 101. Anomaly service 110 may also receive log data from computing environment 111. Log data 131 represents the data that may be received from computing environment 101, computing environment 111, or both.

The log data includes a stream of log codes that anomaly service 110 mines for anomaly blocks 133. For example, anomaly service 110 identifies a non-anomalous block that includes the log codes alpha, bravo, delta. It is assumed for exemplary purposes that the block occurs with enough frequency (e.g. three times) that it may be considered a dominant block.

Removing the dominant block(s) yields anomaly block 134 (echo) and anomaly block 135 (lima, zulu). The revealed blocks may optionally be submitted to a labeling and review process to confirm that a given block represents an anomaly. The labeling and review process may be performed manually by human operators, autonomously, or by a combination of manual and autonomous review.

Anomaly service 110 proceeds to generate anomaly vectors based on the anomaly blocks that were revealed. Anomaly block 134 results in anomaly vector 138, while anomaly block 133 results in anomaly vector 139. Anomaly service 110 may then send the anomaly vectors to one or both of computing environments 101 and 111 to be deployed in the furtherance of anomaly detection/prediction.

In operational scenario 130, computing environment 111 has received the anomaly vectors produced by anomaly service 110. Then, as new log statements are produced, computing environment 111 is able to vectorize the log stream and compare it to the anomaly vectors to determine if an anomalous condition exists.

Log stream 141 represents a log stream produced by one or more elements in computing environment 111. Stream vector 143 is produced from log stream 141 so that a comparison may be made to anomaly vectors 145. System state 147 may be determined based on the result of the comparison. If a match exists between stream vector 143 and one of the anomaly vectors 145, then anomalous state or condition is considered to exist. If not, then the system state is considered normal or at least non-anomalous.

Figure 6:
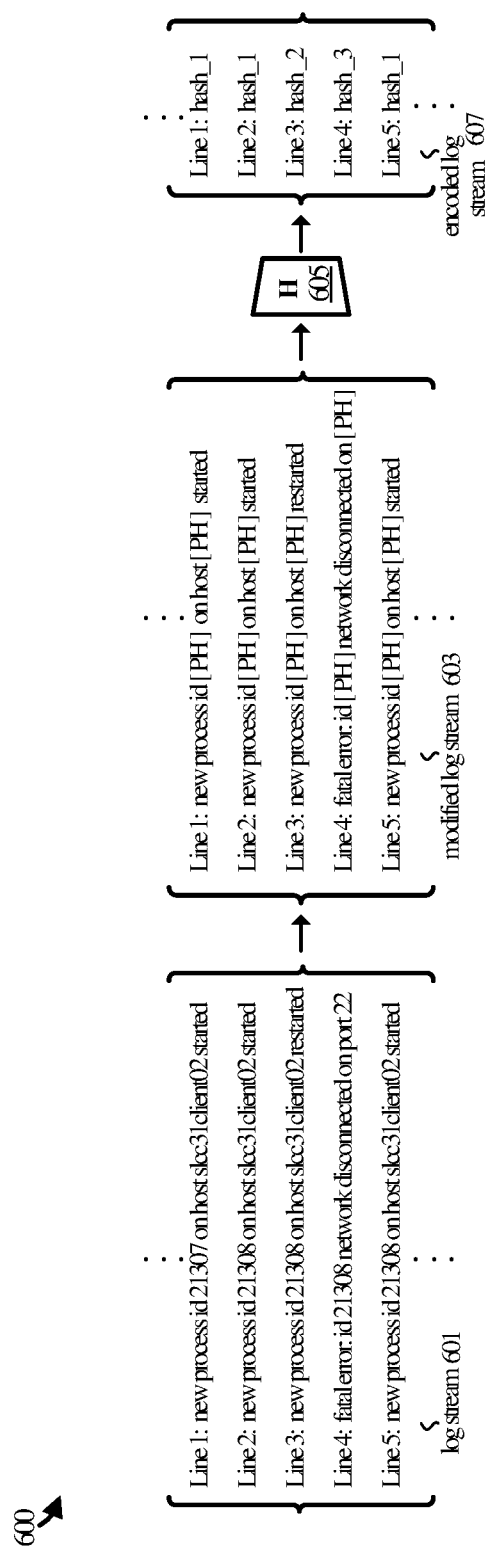
FIG. 6 illustrates a log production scenario in an implementation.

FIG. 6 illustrates an operational scenario 600 in a more detailed example of a log production process. In operation, a computing system generates a stream of log messages 601 related to the state of an information service. Each line of the log stream describes an event that occurred with respect to one or more elements of the service. For example, line_1 indicates that a new process was started. The process is identified by a process ID and the element on which the process was started is identified by a host ID and a client ID. Line_2 describes the start of a different process on the same computing element as line_1.

Then, at line_3, a different event is described. The process described in line_2 was restarted by element combination described in line_2. Line_4 describes the same process as having failed due to a network disconnect. Lastly, line_5 describes the restart of the same process described in line_4 as having failed.

It may be appreciated that all five exemplary log messages pertain to the same host/client combination, although two different processes are referenced. The host identifier uniquely identifies the machine from other machines in the computing environment, while the client identifier uniquely identifies the client from other clients on the machine. The process identifiers also uniquely identify the processes with respect to other processes on the machine. However, the identifiers can make it difficult to detect and/or predict anomalous conditions from log statements because they make each statement so different from every other statement. (As referred to herein, the term "machine" can mean a physical computer, virtual machines, containers, or any other type of computing resource, variation, or combination thereof.)

To mitigate these effects, a log production process (e.g. 200) removes the process, machine, and client identifiers from a copy of the log messages and replaces them with placeholder information. This step can be performed with respect to all of the log messages generated by all of the other machines in a given computing environment so that the aggregate stream of log messages is cleansed of such distinguishing identifiers. The original version of the log messages with the identifiers intact may be preserved for other purposes.

A modified log stream 603 provides an example whereby the process identifiers in lines 1-5 have been replaced with the acronym "PH," although any word or symbol is possible. Likewise, the combination of host and client identifiers has been replaced with the same acronym. In the aggregate, anonymizing or flattening the log statements across all machines improves their usefulness for anomaly detection and prediction.

The modified log stream 603 is then fed into a hash function 605. The hash function, which may be implemented in program instructions on the computing system, takes each line as input as generates a corresponding hash value. As the hash function is deterministic, the same input always produces the same output. This feature, combined with the modified log messages, produces the same hash values for multiple log statements that originally differed, but that are the same after having been modified. For instance, line_1 and line_2 of the original log stream differed by their process IDs but are the same after having their process IDs (and machine/client IDs) replaced with a placeholder. As a result, the hash values produced by hash function 605 are the same (e.g. hash_1). The same result is produced by the hash of line_5, although the hash values for line_3 and line_4 differ (hash_2, hash_3) because their respective log statements differ from the others after the placeholder substitution.

The encoded log stream 607 produced by the hash function 605 may then be sent to an anomaly service (e.g. 110). The encoded log stream 607 include the hash values in a encoded/compressed form (e.g. hash_1, hash_2) as opposed to their actual values. A dictionary for decoding/decompressing the symbols may also be provided to the anomaly service. Optionally, the actual hash values themselves could be sent to the anomaly service.

Figure 7:
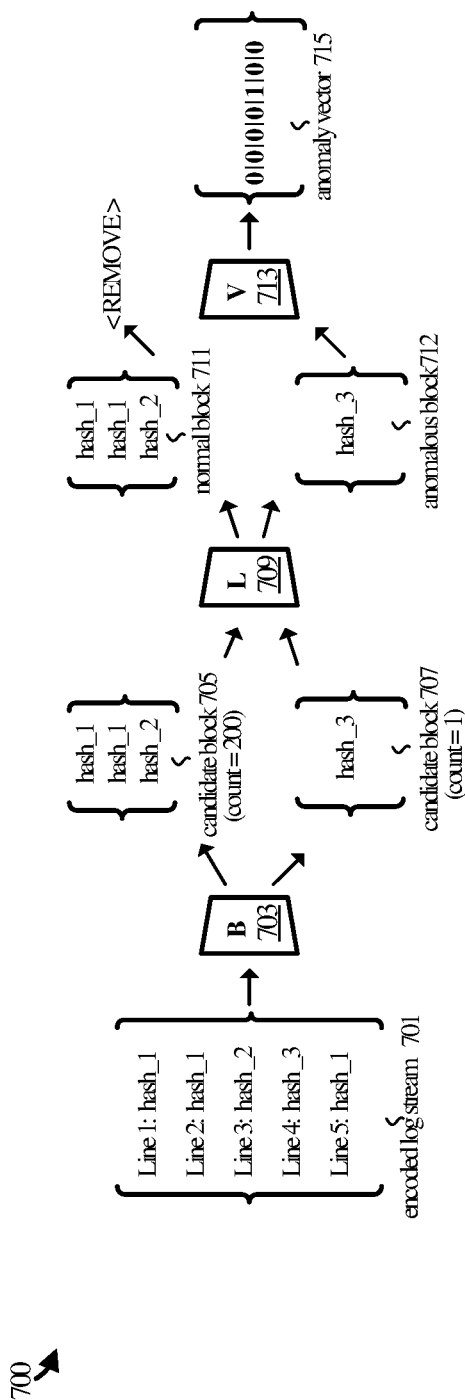
FIG. 7 illustrates an anomaly block extraction scenario in an implementation.

FIG. 7 illustrates an operational scenario 700 in a more detailed example of an anomaly block extract process (e.g. 300) in an implementation. In operation, an anomaly service receives one or more encoded log streams from one or more computing environments, of which encoded log stream 701 is representative. Encoded log stream 701 includes five lines for exemplary purposes, each having log code that comprises a symbolic/encoded representation of a hash value as discussed with respect to FIG. 6.

The anomaly service feeds the log codes into a block extraction function 703, which may be implemented in program instructions on computing system(s) of the service. The block extraction function 703 examines the sequence of log codes to identify contiguous blocks of codes that occur more frequently than others. For instance, it is assumed for exemplary purposes that the function discovers a candidate block 705 that occurs 200 times in the sequence of log codes being examined. For comparison purposes, candidate block 707 is also discovered, but it only occurred once in the sequence of log codes.

The candidate blocks and their respective counts are then fed into a labeling function 709, which may also be implemented in program instructions on computing system(s) of the service. The labeling function 709 determines whether to classify a given candidate block as a non-anomalous block or an anomalous block based at least in part on its count. Candidate block 705 is classified as a non-anomalous block 711 and is therefore removed from the sequence. Candidate block 707 is classified as an anomalous block 712 and is fed as input into a vectorization function 713 that vectorizes the log code(s) contained in the anomalous block.

To vectorizing the anomalous block 712, the vectorization function 713 identifies which log codes are included in the block. Vectorization function 713 may also be implemented in program instructions on computing system(s) of the service. In this example, only one log code (hash_3) is included in the block. The vectorization function 713 then supplies a value to a position in an anomaly vector 715 that corresponds to the log code represented in the block. For instance, the third position from right-to-left in anomaly vector 715 is supplied with the value "1" to indicate that the anomalous block 712 includes the log code "hash_3." Assuming for exemplary purposes that the anomalous block also included the log code "hash_5," then the fifth position in the anomaly vector would be supplied with the value "1." The remaining positions in the vector are supplied with the value "0" to indicate the absence of any of the corresponding log codes in the block.

FIG. 8 illustrates an example scenario 800 of a block extraction process in an implementation. In example scenario 800, process table 801 steps through, from top to bottom, the order of operations in an example of identifying an anomaly block in log sequence.

The first column of process table 801 describes a shorthand substitution of letters for hash codes. The substitution need not actually be performed but rather is shown merely for explanatory purposes. The log code hash_1 is represented by the A, hash_2 is represented by B, and so on. It is assumed for exemplary purposes that there are twenty-six unique log codes in the encoded log stream, although any number of log codes are possible.

Next, process table 801 indicates the current root block being evaluated and the characters and/or symbols in the log sequence. At the start, the sequence is analyzed to find the most frequent log code to set as the initial value of the root block (r-block). With A as the root block, the meta data length (MDL) score of the root block is initially twenty-three.

The evaluation therefore proceeds to grow the root block A at all of its locations in the sequence by one symbol. The first potential root block (p-block) is therefore discovered to be AB. The contiguous symbols AB are replaced at all of their locations in the sequence with the symbol α and the MDL score is calculated to be nineteen. Because the MDL score for the potential block is less than the MDL score for the root block, the evaluation proceeds to replace the root block with the potential block.

The root block therefore becomes α and the evaluation attempts to grow the root block at all of its locations in the sequence. Where multiple potential blocks can be grown from the root block, the evaluation chooses the most frequent potential block. For instance, α can be grown by the addition of C in four locations and by D in three locations. The evaluation therefore proceeds to αC as the next potential block and reverts α at its other locations to its original set of characters AB. The potential block αC is then replaced at all of its location in the sequence by the symbol λ and an MDL score of seventeen is calculated. Because the MDL score for the potential block λ is less than the MDL score for the root block α, the evaluation proceeds to replace the root block with the potential block.

The evaluation then attempts to grow the root block at all of its locations. However, the root block λ cannot be grown at any locations in the sequence. The root block λ is therefore considered a non-anomalous block and its characters or values can be removed from the sequence. The root block therefore reverts to its previous value α and the evaluation begins again, but with λ substituted at all locations for ABC.

With the root block set to α, the evaluation attempts to grow the root block at all of its locations and identifies a new potential block δ=αD, or ABD. The potential block ABD is then replaced at all of its location in the sequence by the symbol δ and an MDL score of fifteen is calculated. Because the MDL score for the potential block δ is less than the MDL score for the root block α, the evaluation proceeds to replace the root block with the potential root block.

The evaluation then attempts to grow the root block δ at all of its locations and, determining that it cannot be grown, proceeds to identify the next root block. The next root block is Y for which the MDL score is 14. Y can be grown at only one location by adding Z and the MDL score for the potential block YZ is 16. Because 16 is greater than 14, YZ fails as a potential root block and is therefore revealed as an anomaly block.

Figure 9A:
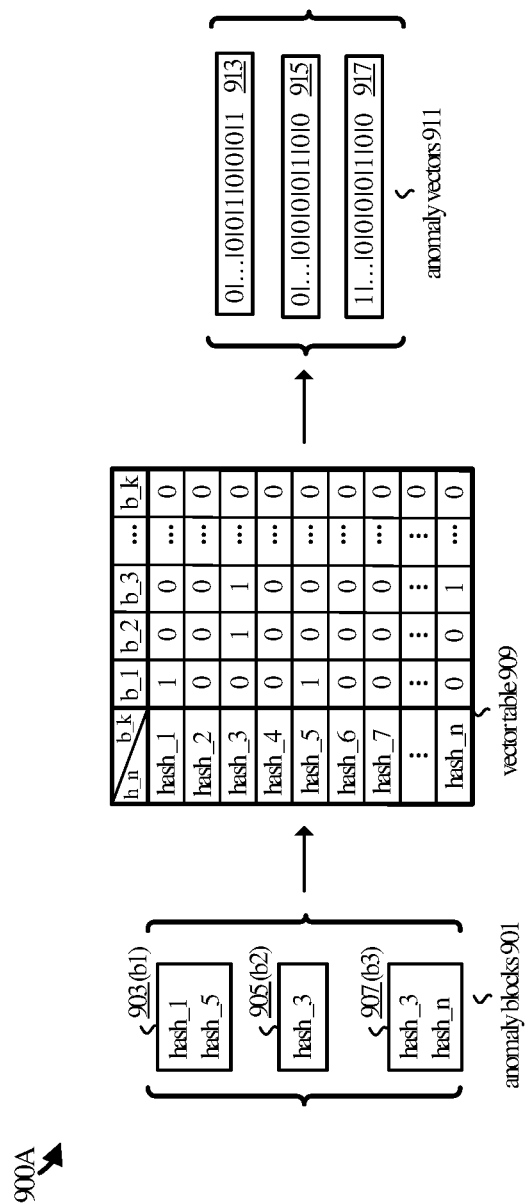
FIGS. 9A-9C illustrate an anomaly detection scenario in an implementation.
Figure 9B:
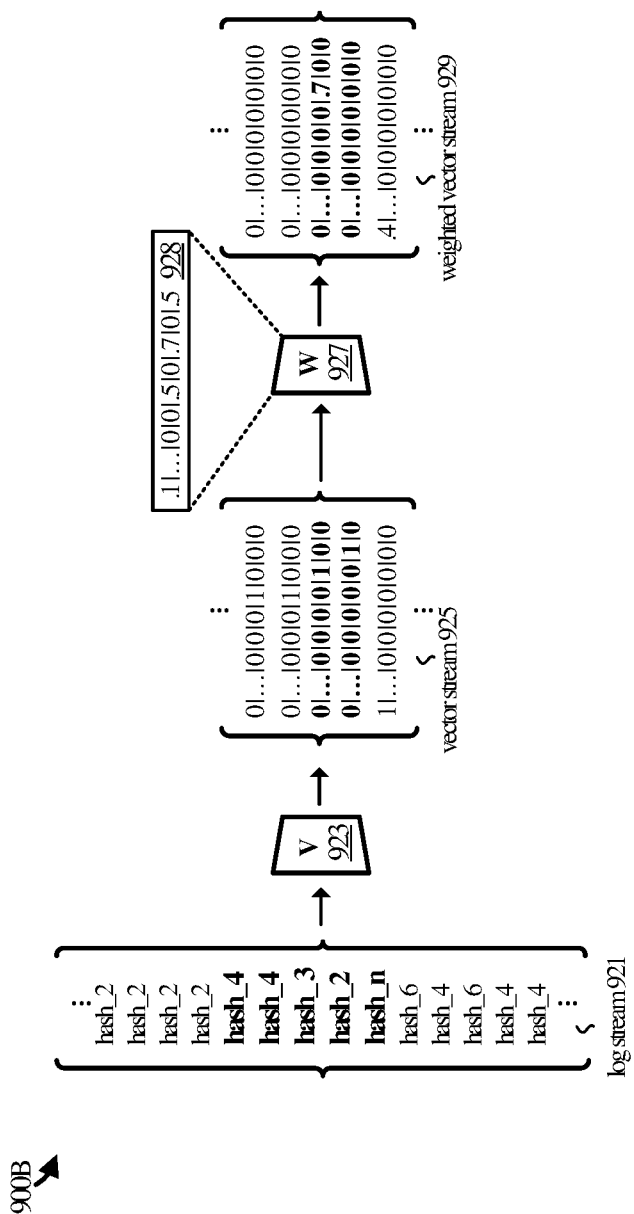
Figure 9C:
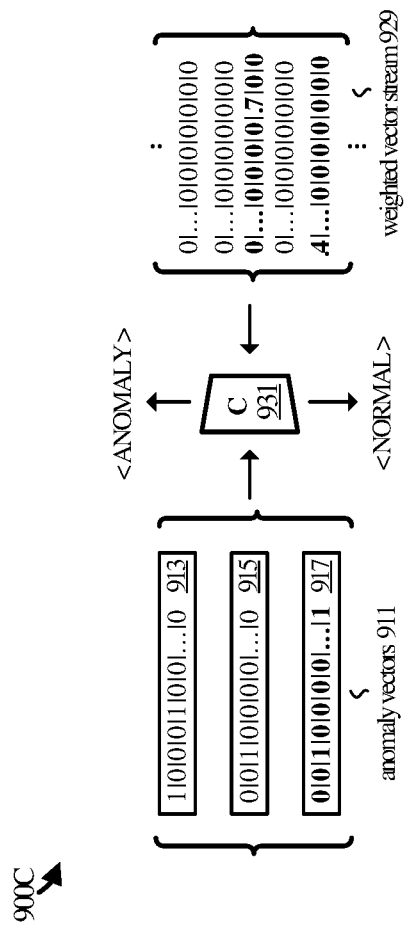

The anomaly block may then be vectorized and distributed to clients in order to detect and/or predict anomalous operational states. FIGS. 9A-9C illustrate one such scenario ranging from the production of anomaly vectors in an anomaly service to the deployment of the vectors on a client. In a first portion of 900A of the scenario illustrated in FIG. 9A, an anomaly service has identified anomaly blocks 901 from a stream of log codes produced by one or more clients in one or more computing environments. Anomaly blocks 901 include block 903, block 905, and block 907. Block 903 includes two log codes represented by hash_1 and hash_5. Block 905 includes just one log code represented by hash_3. Block 907 includes two log codes represented by hash_3 and hash_n.

The left most column of vector table 909 lists all of the possible n-number of hash codes from hash_1 to hash_n. The upper most row identifies the anomaly blocks from the first block b_1 to the k-th block, b_k. Each cell defined by a given hash code/block combination contains a value indicative of whether the block includes the hash code. A zero indicates that the block does not include the hash code, whereas a one indicates that the block does include the hash code. With respect to anomaly blocks 901, block 903 is defined in vector table 909 by a one at the cell defined by hash_1 and b_1 and at the cell defined by hash_5 and b_1. The remaining cells in column b_1 have zero values since block 903 contains no other hash codes.

The vector values for anomaly block b_2 and b_3 are populated in the same way. That is, block 905 is defined in vector table 909 by a one at the cell defined by hash_3 and b_2 and zeros at all other positions. Block 907 is defined in vector table 909 by a one at the cell defined by hash_3 and b_3 and at the cell defined by hash_n and b_3. The remaining cells in column b_3 have zero values since block 907 contains no other hash codes.

The resulting anomaly vectors 911 are strings of binary values at positions from right-to-left that correspond to the values in the cells for each block in vector table 909. For example, anomaly vector 913, which corresponds to block 903, comprises the string 0 . . . 0010001. The "1" in the right-most position corresponds to the value in the cell defined by hash_1 and b_1, while the "1" in the fifth position from the right corresponds to the value in the cell defined by hash_5 and b_1. All other values in anomaly vector 913 are "0."

Anomaly vector 915, which corresponds to block 905, follows the same convention and comprises the string 0 . . . 0000100. The "1" in the third position from the right corresponds to the value in the cell defined by hash_3 and b_2, while all other values are zero.

Anomaly vector 917, corresponds to block 907, comprises the string 1 . . . 0000100. The "1" in the left-most position corresponds to the value in the cell defined by hash_n and b_3, while the "1" in the third position from the right corresponds to the value in the cell defined by hash_3 and b_3. All other values in anomaly vector 917 are "0."

The anomaly service distributes the vectors to one or more computing environments to facilitate anomaly detection and prediction as illustrated in the second portion 900B of the operational scenario described by FIGS. 9A-9C.

FIG. 9B includes a log stream 921 representative of a stream of log codes generated by a client computing system. The log codes in this example are hash values, which the client inputs to a vectorization function 923. The vectorization function vectorizes the log stream 921 to produce a vector stream 925. Like the vectorization process illustrated in FIG. 9A, each log code can be vectorized by indicating a "1" at the position in a vector corresponding to the hash value represented by the log code.

As an example, a set of log codes in the middle of log stream 921 are shown in bold and their corresponding vectors are provided in vector stream 925. The log codes represented by hash_4 per this convention translate to a vector having a "1" at the fourth position from the right and zeros as all other positions. Log codes represented by hash_3 thus translate to a vector having a "1" at the third position from the right and zeros as all other positions. Log codes represented by hash_2 translate to a vector having a "1" at the second position from the right and zeros as all other positions. Lastly, log codes represented by hash_n translate to a vector having a "1" at the n-th position from the right and zeros as all other positions.

The client inputs the vector stream 925 into a weighting function 927. The weight function 927 applies a weighted vector 928 to each of the individual vectors in vector stream 925. The weighted vector 928 comprises a weight value between 0 and 1 at each position in the vector, which correspond to the positions in the vectors of vector stream 925. For example, a "1" in a position of the weighted vector 928 indicates that the corresponding position in the vector stream 925 should be given its full value, whereas a "0.5" in a position of the weighted vector values the corresponding position in vector stream 925 at half its full value.

Weighting function 927 produces a weighted vector stream 929 that is the product of each position in weighted vector 928 with its corresponding position in each of the vectors of vector stream 925. As an example, the middle vector in both vector stream 925 and weighted vector stream 929 is shown in bold to highlight the product of the weight value given to hash_3 (0.7) times the value (1) at the hash_3 position in the middle vector. As another example, the second vectors from the bottom in vector stream 929 weighted vector stream 929 are shown in bold to highlight the zero-weight given to hash_2 in weighted vector 928.

Finally, FIG. 9C illustrates the last portion 900C of the operational scenario illustrated in FIGS. 9A-9C. In FIG. 9C, the anomaly vectors 911 produced by the anomaly service have been distributed to clients in their respective computing environments. Each client generates its own vector stream represented by weighted vector stream 929.

A comparison function 931 receives the anomaly vectors 911 and weighted vector stream 929 as input and performs a comparison calculation of each vector in the weighted vector stream 929 against each vector in the anomaly vectors 911. The comparison function may be, for example, a cosine similarity function that evaluates the dot-product of each anomaly vector times each vector in the vector stream. The comparison function then analyzes the results of the calculations to determine whether one of the weighted anomaly vectors 911 comprises a sufficient match with one or more of the anomaly vectors 911. If so, then an anomalous condition is considered to exist or is predicted. If not, then a normal state exists.

FIG. 10 illustrates computing system 1001 that is representative of any system or collection of systems in which the various processes, programs, services, and scenarios disclosed herein may be implemented. Examples of computing system 1001 include, but are not limited to, server computers, routers, web servers, cloud computing platforms, and data center equipment, and any other type of physical or virtual server machine, physical or virtual router, container, and any variation or combination thereof.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements anomaly process 1006, which is representative of the processes discussed with respect to the preceding Figures including log production process 200, extraction process 300, and detection process 400. When executed by processing system 1002 to provide block-based anomaly detection and prediction, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including anomaly process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing log production processes, anomaly block extraction processes, and anomaly detection processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system customized to provide block-based anomaly processing as described herein. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

The invention claimed is:

1. A method for identifying anomalies in computing environments, the method comprising:
receiving log data from a plurality of nodes in a computing environment, wherein the log data comprises a sequence of information indicative of log messages produced by the plurality of nodes;
identifying, in the sequence of information, non-anomalous blocks of the log messages;
revealing anomalous blocks of log messages by extracting the non-anomalous blocks from the log data;
generating anomaly vectors based at least on the anomalous blocks; and
distributing the anomaly vectors to at least one node of the plurality of nodes, wherein the at least one node detects anomalies using the anomaly vectors.

2. The method of claim 1 wherein identifying the non-anomalous blocks of the log messages comprises identifying dominant patterns representative of the non-anomalous blocks, and wherein identifying the dominant patterns within the sequence of information comprises:
identifying potential patterns within the sequence of information; and
selecting the dominant patterns from the potential patterns based at least on a scoring function applied to one or more of the potential patterns.

3. The method of claim 2 wherein the scoring function promotes a subset of the potential patterns that occur frequently within the sequence of information relative to a different subset of the potential patterns that occur less frequently within the sequence of information.

4. The method of claim 3 wherein the scoring function determines, for each potential pattern of the potential patterns, a relative dominance of the potential pattern based on a description length of the sequence of information when encoded with a compressed representation of the potential pattern.

5. The method of claim 4 wherein the sequence of information comprises a sequence of log codes and wherein each log code of the sequence of log codes comprises a symbolic representation of a possible hash value, and wherein the log data includes a code book that maps each unique log code to a different one of a set of possible hash values.

6. The method of claim 5 wherein each anomaly vector of the anomaly vectors comprises a string of numbers that correspond by position to a set of possible log codes.

7. The method of claim 6 wherein generating the anomaly vectors based at least on the anomalous blocks comprises, for each one of the anomaly vectors, setting a value of each number in the string of numbers to indicate a presence, or lack thereof, of a corresponding one of the set of possible log codes in an anomalous block represented by the anomaly vector.

8. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to at least:
receive log data from a plurality of nodes in a computing environment, wherein the log data comprises a sequence of information indicative of log messages produced by the plurality of nodes;

identify, in the sequence of information, non-anomalous blocks of the log messages;

reveal anomalous blocks of log messages by extracting the non-anomalous blocks from the log data;

generate anomaly vectors based at least on the anomalous blocks; and distribute the anomaly vectors to at least one node of the plurality of nodes, wherein the at least one node detects anomalies using the anomaly vectors.

9. The computing apparatus of claim 8, wherein to identify the non-anomalous blocks of the log messages, the program instructions, when executed by the one or more processors, direct the computing apparatus to identify dominant patterns representative of the non-anomalous blocks of the log messages.

10. The computing apparatus of claim 9, wherein to identify dominant patterns representative of the non-anomalous blocks of the log messages, the program instructions, when executed by the one or more processors, direct the computing apparatus to:

identify potential patterns within the sequence of information; and select the dominant patterns from the potential patterns based at least on a scoring function applied to one or more of the potential patterns.

11. The computing apparatus of claim 10 wherein the scoring function promotes a subset of the potential patterns that occur frequently within the sequence of information relative to a different subset of the potential patterns that occur less frequently within the sequence of information.

12. The computing apparatus of claim 11 wherein the scoring function determines, for each potential pattern of the potential patterns, a relative dominance of the potential pattern based on a description length of the sequence of information when encoded with a compressed representation of the potential pattern.

13. The computing apparatus of claim 12 wherein the sequence of information comprises a sequence of log codes and wherein each log code of the sequence of log codes comprises a symbolic representation of a possible hash value, and wherein the log data includes a code book that maps each unique log code to a different one of a set of possible hash values.

14. The computing apparatus of claim 13 wherein each anomaly vector of the anomaly vectors comprises a string of numbers that correspond by position to a set of possible log codes.

15. The computing apparatus of claim 14 wherein generating the anomaly vectors based at least on the anomalous blocks comprises, for each one of the anomaly vectors, setting a value of each number in the string to indicate a presence, or lack thereof, of a corresponding one of the set of possible log codes in an anomalous block represented by the anomaly vector.

16. One or more computer-readable storage media having program instructions stored thereon, wherein the program instructions, when read and executed by a processing system, direct the processing system to at least:

receive log data from a plurality of nodes in a computing environment, wherein the log data comprises a sequence of information indicative of log messages produced by the plurality of nodes;

identify, in the sequence of information, non-anomalous blocks of the log messages;

reveal anomalous blocks of log messages by extracting the non-anomalous blocks from the log data;

generate anomaly vectors based at least on the anomalous blocks; and distribute the anomaly vectors to at least one node of the plurality of nodes, wherein the at least one node detects anomalies using the anomaly vectors.

17. The one or more computer-readable storage media of claim 16, wherein to identify the non-anomalous blocks of the log messages, the program instructions, when executed by the processing system, direct the processing system to identify dominant patterns representative of the non-anomalous blocks of the log messages.

18. The one or more computer-readable storage media of claim 17, wherein to identify dominant patterns representative of the non-anomalous blocks of the log messages, the program instructions, when executed by the processing system, direct the processing system to:

identify potential patterns within the sequence of information; and select the dominant patterns from the potential patterns based at least on a scoring function applied to one or more of the potential patterns.

19. The one or more computer-readable storage media of claim 18 wherein the scoring function promotes a subset of the potential patterns that occur frequently within the sequence of information relative to a different subset of the potential patterns that occur less frequently within the sequence of information.

20. The one or more computer-readable storage media of claim 19 wherein the scoring function determines, for each potential pattern of the potential patterns, a relative dominance of the potential pattern based on a description length of the sequence of information when encoded with a compressed representation of the potential pattern.

* * * * *

UNITED STATES PATENT AND TRADEMARK OFFICE
CERTIFICATE OF CORRECTION

PATENT NO. : 11,797,412 B2
APPLICATION NO. : 17/696401
DATED : October 24, 2023
INVENTOR(S) : Wang et al.

It is certified that error appears in the above-identified patent and that said Letters Patent is hereby corrected as shown below:

On the Title Page

On page 2, Column 1, under Other Publications, Line 5, delete "elastic .co" and insert -- elastic.co --, therefor.

In the Specification

In Column 4, Line 3, delete "patterns;" and insert -- patterns. --, therefor.

In Column 11, Line 8, delete "a" and insert -- α --, therefor.

In Column 11, Line 12, delete "a" and insert -- α --, therefor.

In Column 11, Line 30, delete "a," and insert -- α, --, therefor.

Signed and Sealed this
Eighteenth Day of June, 2024

Katherine Kelly Vidal
*Director of the United States Patent and Trademark Office*